（12）United States Patent
Grantz

(10) Patent No.: US 8,575,880 B2
(45) Date of Patent: Nov. 5, 2013

(54) DIRECT CURRENT MOTOR WITH INDEPENDENTLY DRIVEN AND SWITCHABLE STATORS

(75) Inventor: Alan L. Grantz, Aptos, CA (US)

(73) Assignee: Alan Lyndon Grantz, Aptos, CA (US)

( * ) Notice: Subject to any disclaimer, the term of this patent is extended or adjusted under 35 U.S.C. 154(b) by 313 days.

(21) Appl. No.: 13/045,482

(22) Filed: Mar. 10, 2011

(65) Prior Publication Data

US 2011/0227523 A1 Sep. 22, 2011

Related U.S. Application Data

(60) Provisional application No. 61/314,970, filed on Mar. 17, 2010.

(51) Int. Cl.
*H02P 6/08* (2006.01)
*H02P 25/02* (2006.01)

(52) U.S. Cl.
CPC .................................. *H02P 25/021* (2013.01)
USPC ........... 318/724; 318/720; 318/721; 318/722; 318/723

(58) Field of Classification Search
CPC .................................................. H02P 25/021
USPC ......................................... 318/724, 720–723
See application file for complete search history.

(56) References Cited

U.S. PATENT DOCUMENTS 5,614,799 A * 3/1997 Anderson et al. ........ 318/400.09
5,652,493 A * 7/1997 Hendershot, Jr. ............. 318/701
6,437,529 B1 * 8/2002 Brown ..................... 318/400.26

* cited by examiner

*Primary Examiner* — Bentsu Ro
*Assistant Examiner* — David Luo
(74) *Attorney, Agent, or Firm* — Wax Law Group

(57) ABSTRACT

An apparatus and method are provided for adjusting torque and speed of a motor, while remaining within the voltage limit of a power supply. The invention provides a brushless direct current motor with independently driven and switchable stators. In an aspect, each stator and the rotor is structured to function as an independent motor separate from another stator and the rotor. A first power electronics directs energy to a first stator, and a second power electronics directs energy to a second stator. A rotor rotates relative to the stators. In an aspect, a commutation electronics determines electrical position of the rotor relative to the stators, and synchronizes current pulses directed to a sequentially selected phase of the stators, to generate a rotating magnetic field that communicates with the rotor. A controller sets the connection of the first power electronics in series or in parallel with the second power electronics.

17 Claims, 14 Drawing Sheets

SERIES CONNECTION

PARALLEL CONNECTION

12 TOOTH STATOR WITH 4 OR 8 POLE MAGNET

12 TOOTH STATOR WITH 10 OR 14 POLE MAGNET

9 TOOTH STATOR WITH 6, 8 OR 10 POLE MAGNET

DIRECT CURRENT MOTOR WITH INDEPENDENTLY DRIVEN AND SWITCHABLE STATORS

CROSS REFERENCE TO RELATED APPLICATION

This application is based on and claims benefit of provisional application Ser. No. 61/314,970, filed Mar. 17, 2010.

FIELD

The invention relates generally to direct current motors, and more particularly to a method and apparatus to adjust motor torque and speed while remaining within the voltage limit of a power supply.

BACKGROUND

Brushless direct current (BLDC) motors are utilized in many applications, particularly devices such as computer hard drives and CD/DVD players. Cooling fans in electronic equipment are powered by BLDC motors. They are also found in cordless power tools. Low speed and low power BLDC motors are used in direct-drive turntables for analog audio discs. High power BLDC motors are found in electric vehicles and hybrid vehicles.

Electric vehicles operate over wide ranges of speed and load. The motor of the vehicle must have sufficient torque to initially move the vehicle at a low speed, and must also be capable of propelling the vehicle at a desired cruise speed. For direct current (DC) motors, the available supply voltage and the designed maximum motor speed effectively determine the motor voltage constant (volts/rad/s), and hence, the motor torque constant (N-M/amp). As vehicle design cruise speeds increase, there must be a corresponding decrease in the voltage and torque constants in order to remain within the voltage limit of the power supply. The result is that for a fixed supply voltage, starting torque is reduced as vehicle speed capability is increased.

Some conventional motors employ a mechanical transmission with two or more speeds. However, a mechanical transmission adds weight, cost and efficiency losses to the vehicle power train. Alternate conventional motors provide a BLDC motor with adjustable voltage and torque constants. Stator windings are switched between various combinations of serial and parallel connections on a common stator.

SUMMARY

An apparatus and method are described herein for providing a brushless direct current motor. The DC motor employs independently driven and switchable stators. The motor includes at least a first stator and a second stator, positioned for relative rotation with a rotor. The motor further includes a first power electronics for directing energy to the first stator, and a second power electronics for directing energy to the second stator. These and various other features and advantages will be apparent from a reading of the following detailed description.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION

Figure 1:
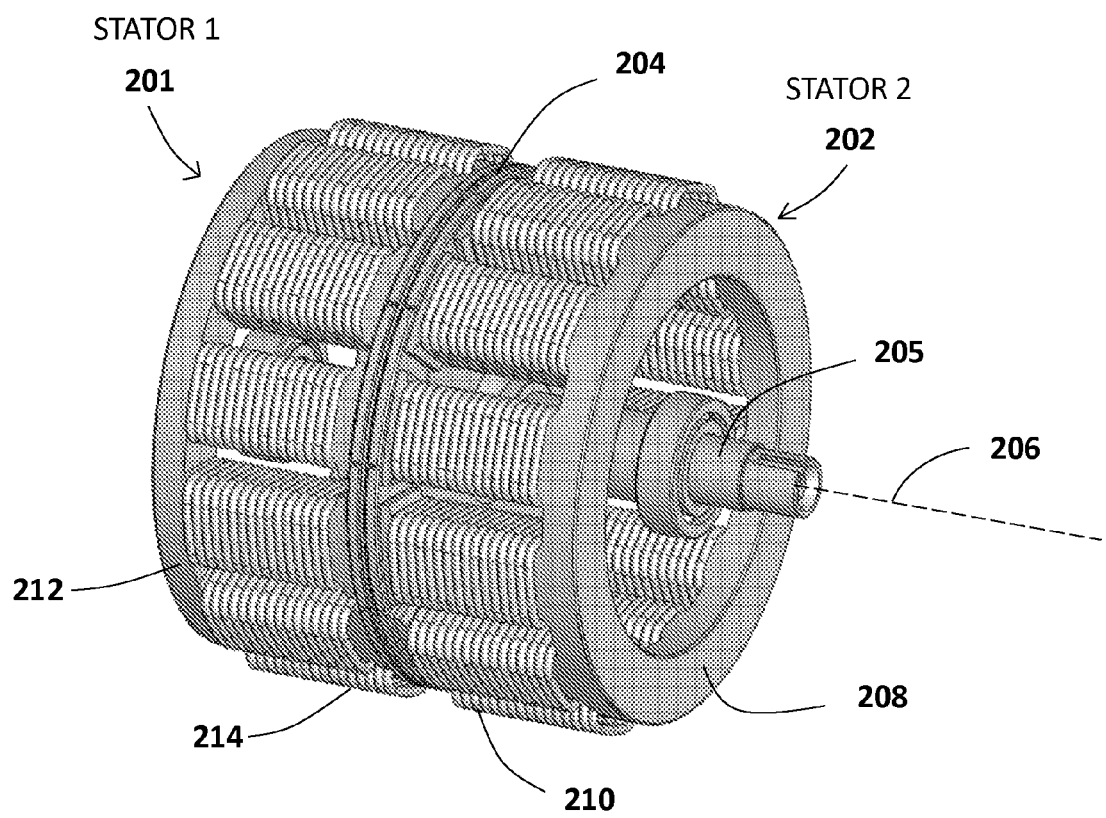
FIG. 1 is a perspective view of a biaxial flux motor in which an embodiment of the present invention is useful.

Exemplary embodiments are described with reference to specific configurations. Those of ordinary skill in the art will appreciate that various changes and modifications can be made while remaining within the scope of the appended claims. Additionally, well-known elements, devices, components, methods, process steps and the like may not be set forth in detail in order to avoid obscuring the invention.

A conventional brushless direct current (BLDC) motor includes a single stator with multiple coils. A collection of coils that are electrically connected together within the motor is referred to herein as a phase or phase winding. Typical BLDC motors have three phase windings, although other numbers of phases are possible. In a three phase motor (phases A, B and C), the three phases are connected together in either a WYE or a DELTA configuration. The WYE configuration effectively connects each phase pair (AB, AC, BC) in series, while the DELTA configuration connects each phase pair in parallel. For a fixed volume of coil wire and available drive voltage, the WYE configuration exhibits a higher torque constant, but a lower top speed. The DELTA configuration exhibits a higher top speed, but lower torque constant. If each coil is double-wound (i.e., two sets of wire), the coils can be connected in series or parallel, thereby resulting in the same speed/torque variations as described with WYE and DELTA configurations. Multiple coils within a phase can also be connected in series or parallel, thereby resulting in the same speed/torque variations as described.

Electrical connections are made to each of the phase windings, and brought to the outside of the motor at a terminal. Power cables connect the phase winding terminals to commutation electronics. The commutation electronics sense relative electrical position between a rotating magnet structure (rotor), and the stationary phase windings. Phase connections can be switched between WYE and DELTA, and the coils making up each of the phases can be switched between series and parallel. Here, a commutation electronics, a power electronics, and a coil/stator connection switching electronics are used. In a conventional motor, a minimum of nine power carrying conductors are brought outside the motor so that switches can reconfigure the phases between series and parallel. A drawback to this approach is that the switches must be bi-directional since the current direction within each phase constantly cycles from positive to negative. As such, conventional MOSFET and IGBT power switches are not utilized since they are unidirectional and cannot manage current direction cycling. A single MOSFET can be replaced with dual MOSFETs, but this brings increased cost, complexity and power losses. Electromechanical relays can be used, but this brings increased cost, complexity and lower reliability.

An apparatus and method are described herein for adjusting torque and speed of a DC motor while remaining within the voltage limit of a power supply. In an embodiment, the present invention can be used with a conventional phase winding scheme in which the phases are connected together in either a WYE or a DELTA configuration. In an embodiment, the present invention can be used with a conventional motor having series or parallel windings within each coil, and series or parallel connections of coils within a phase winding. In an embodiment, the present invention can be used with unidirectional power switches such as MOSFET and IGBT.

It will be apparent that in addition to brushless DC motors, features of the discussion and claims may be utilized with spindle motors, various fluid dynamic bearing designs including hydrodynamic and hydrostatic bearings, and other motors employing a stationary and a rotatable component, including motors employing conical bearings. Further, embodiments of the present invention may be employed with a fixed shaft or a rotating shaft. Also, as used herein, the terms "axially" or "axial direction" refers to a direction along a centerline axis length of a shaft (e.g., along axis 206 of shaft 205 shown in FIG. 1), and "radially" or "radial direction" refers to a direction perpendicular to the axis 206, and passing through axis 206.

Referring to the drawings wherein identical reference numerals denote the same elements throughout the various views, FIG. 1 illustrates a representative view of a dual stator, single rotor, biaxial flux motor design in an embodiment of the present invention. Stators 201 and 202, including stator coils 210 and 214, and stator laminators 208 and 212, are positioned for relative rotation with rotor 204. Rotor 204 rotates about the centerline of shaft 205.

Figure 2:
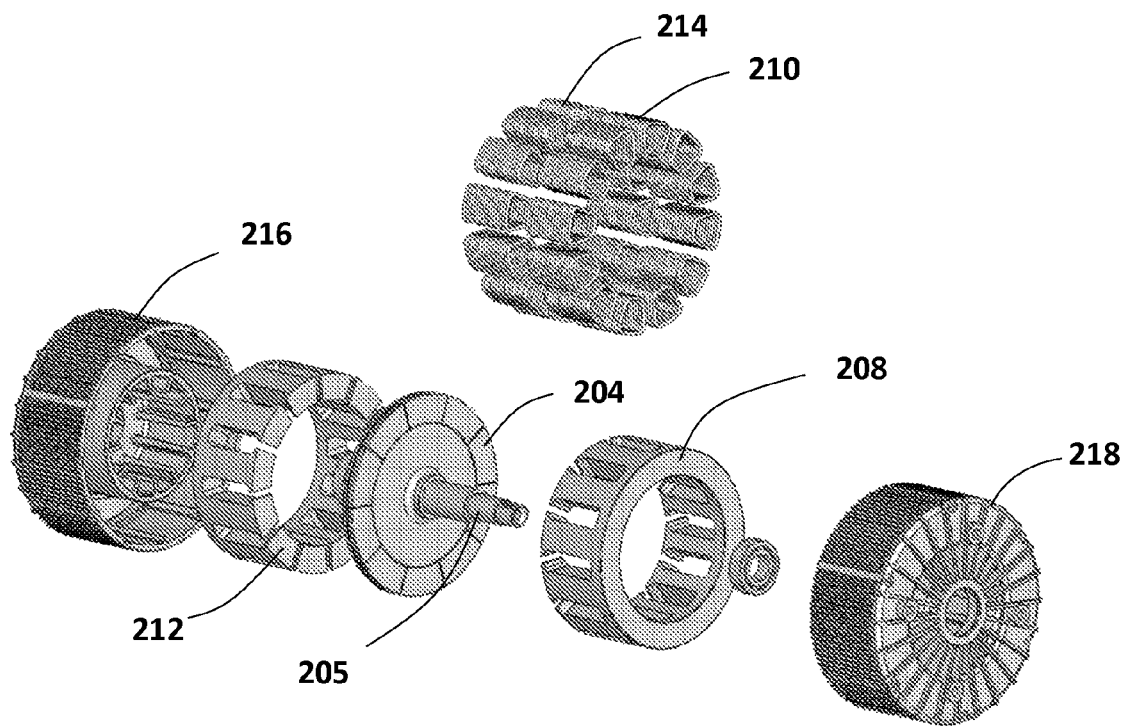
FIG. 2 is an exploded view of the biaxial flux motor as in FIG. 1, further illustrating motor casings.

An exploded view of the biaxial flux motor with motor casing sections 216 and 218 is illustrated in FIG. 2. Stator coils 210 and 214 are shown separated from stator laminators 208 and 212 but are wound about the stator laminators when the motor is assembled.

Figure 3:
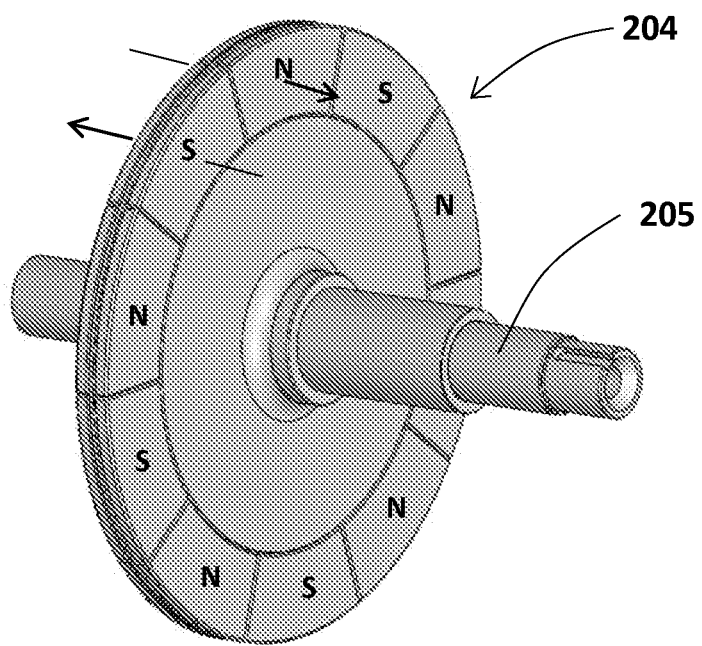
FIG. 3 is a perspective view of the rotor as in FIG. 1, illustrating the rotor with a ten pole magnet and magnetic flux lines passing therethrough.

FIG. 3 illustrates rotor 204 that utilizes a ten pole magnet, as an example. Ten magnets are situated on, and 360 degrees about, each of the two sides of rotor 204. Magnetic flux lines are shown passing through rotor 204 as they pass to and from the stators. As an example, in the biaxial flux motor, magnetic flux passes from stator 201 to the rotor and then to stator 202. The magnetic flux passing from stator 201 passes through the rotor 204 before reaching the second stator 202, which is situated on an opposite side of rotor 204.

In an example biaxial stator embodiment, stator 201 has 3 phases, namely, phase A1, phase B1, and phase C1. Stator 202 has three phases, namely, phase A2, phase B2, and phase C2. Phases A1 and A2 are like phases that share the same magnetic flux, phases B1 and B2 are like phases that share the same magnetic flux, and phases C1 and C2 are like phases that share the same magnetic flux. Like phases are defined herein as phases that undergo substantially the same temporal magnitude and direction of magnetic flux.

The back EMF (BEMF) waveforms are closely matched between opposing stators with the biaxial flux configuration. Moreover, the biaxial flux configuration is insensitive to sources of potential stator imbalance including coil resistance variations, mechanical position variation within a magnetic circuit, and magnetic strength variations. Coil resistance imbalance is a function of the number of turns, wire tension and wire temperature. Coil resistance imbalance and wire tension are controlled by the manufacturing process. Wire temperature is self-limiting, as resistance increases with temperature the current is reduced. Mechanical position variation is mainly due to variation in the air gap. The magnetic flux density is highly dependent on the air gap. In radial flux designs, rotor to stator eccentricity is the primary cause of air gap variation. In dual rotor, single stator, axial flux designs the primary cause of air gap variation is rotor to shaft perpendicularity. In dual rotor, single stator, axial flux designs, average air gap variations from rotor to stator cancel out. Finally, magnetic strength variation is primarily due to variability in the magnetizing process, and magnet handling (possible demagnetization).

Similar to the biaxial flux motor, magnetic flux in the radial flux motor passes from one stator through the rotor, before reaching the second stator. However, the like phases do not share the same magnetic flux. In an alternative embodiment, the radial flux motor includes a second rotor in which the first stator magnetically interacts with the first rotor, and the second stator magnetically interacts with the second rotor.

Figure 4:
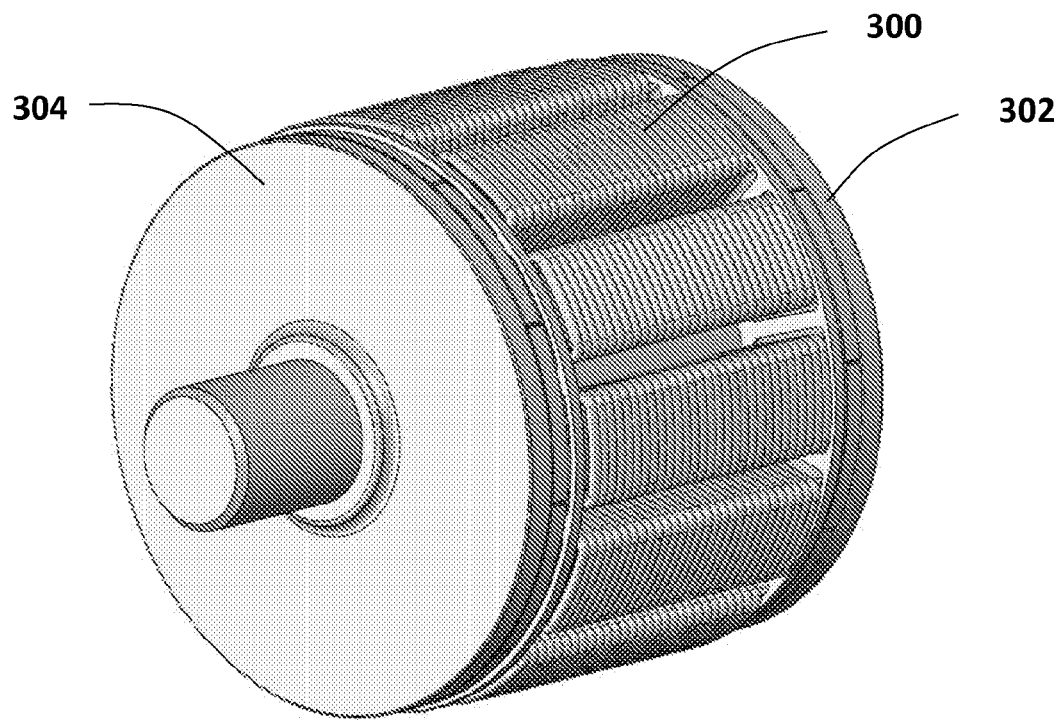
FIG. 4 is a perspective view of a uniaxial flux motor in which an embodiment of the present invention is useful.

Referring to FIG. 4, a uniaxial flux motor design is illustrated in which stator 300 is situated between rotor 302 and rotor 304. Rotors 302 and 304 rotate together relative to stator 300. In an example, stator 300 includes two multiphase windings. The first multiphase windings includes at least a first phase winding element, a second phase winding element, and a third phase winding element. The second multiphase windings includes at least a fourth phase winding element, a fifth phase winding element, and a sixth phase winding element. Magnetic flux passes from the first phase winding element to the rotor (e.g., rotor 302), and then to the second phase winding element, the third phase winding element, the fourth phase winding element, the fifth phase winding element, or the sixth phase winding element.

In an example, the first multiphase windings have at least 3 phases including phase A1, phase B1 and phase C1. The second multiphase windings have at least 3 phases including phase A2, phase B2 and phase C2. Phases A1 and A2 are like phases that do not share the same magnetic flux, phases B1 and B2 are like phases that do not share the same magnetic flux, and phases C1 and C2 are like phases that do not share the same magnetic flux. The like phases undergo substantially same temporal magnitude and direction of magnetic flux.

In the radial flux motor with one stator, the stator includes, for example, two multiphase windings. The first multiphase windings includes at least a first phase winding element, a second phase winding element, and a third phase winding element. The second multiphase windings includes at least a fourth phase winding element, a fifth phase winding element, and a sixth phase winding element. The first phase winding element is adjacent to the second phase winding element and to the fourth phase winding element. Magnetic flux passes from the first phase winding element to the second phase winding element or to the fourth phase winding element, without having to pass through the rotor before passing to the second phase winding element or to the fourth phase winding element.

Figure 5A:
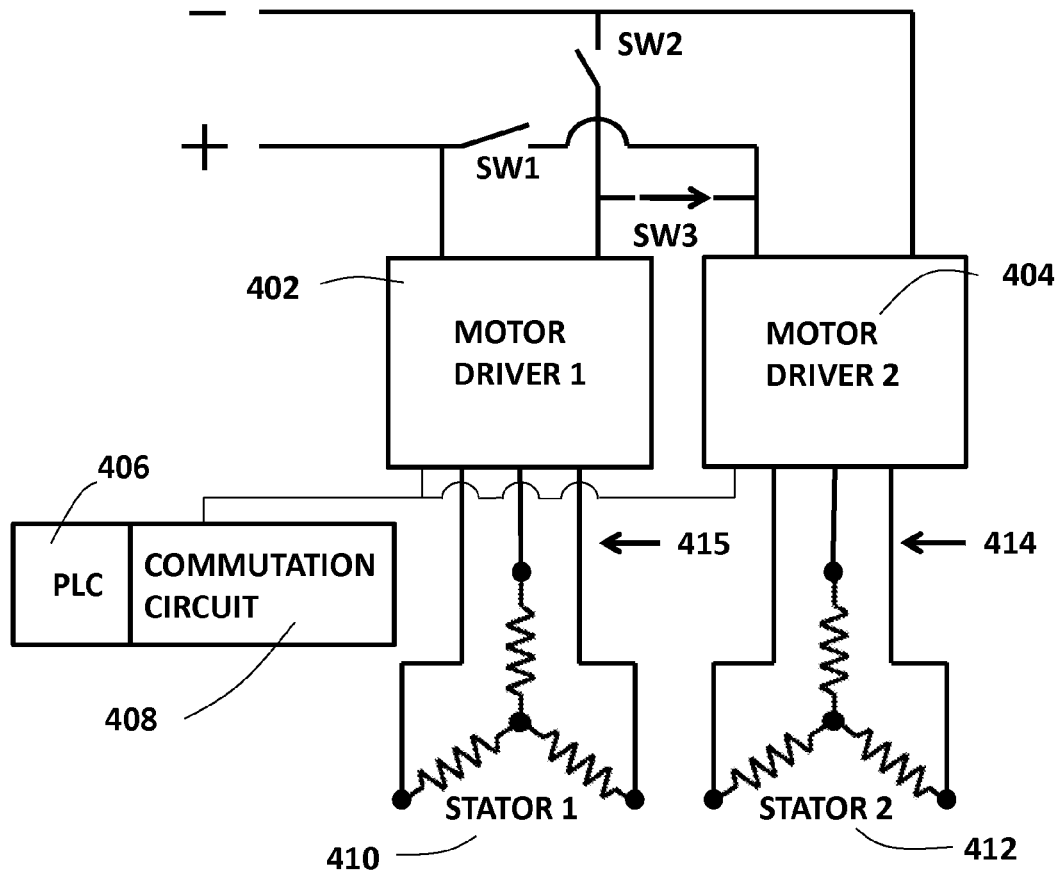
FIG. 5A is a schematic representation of a DC motor employing independently driven and switchable stators, in which the motor drivers are connected in series, in accordance with an embodiment of the present invention.
Figure 5B:
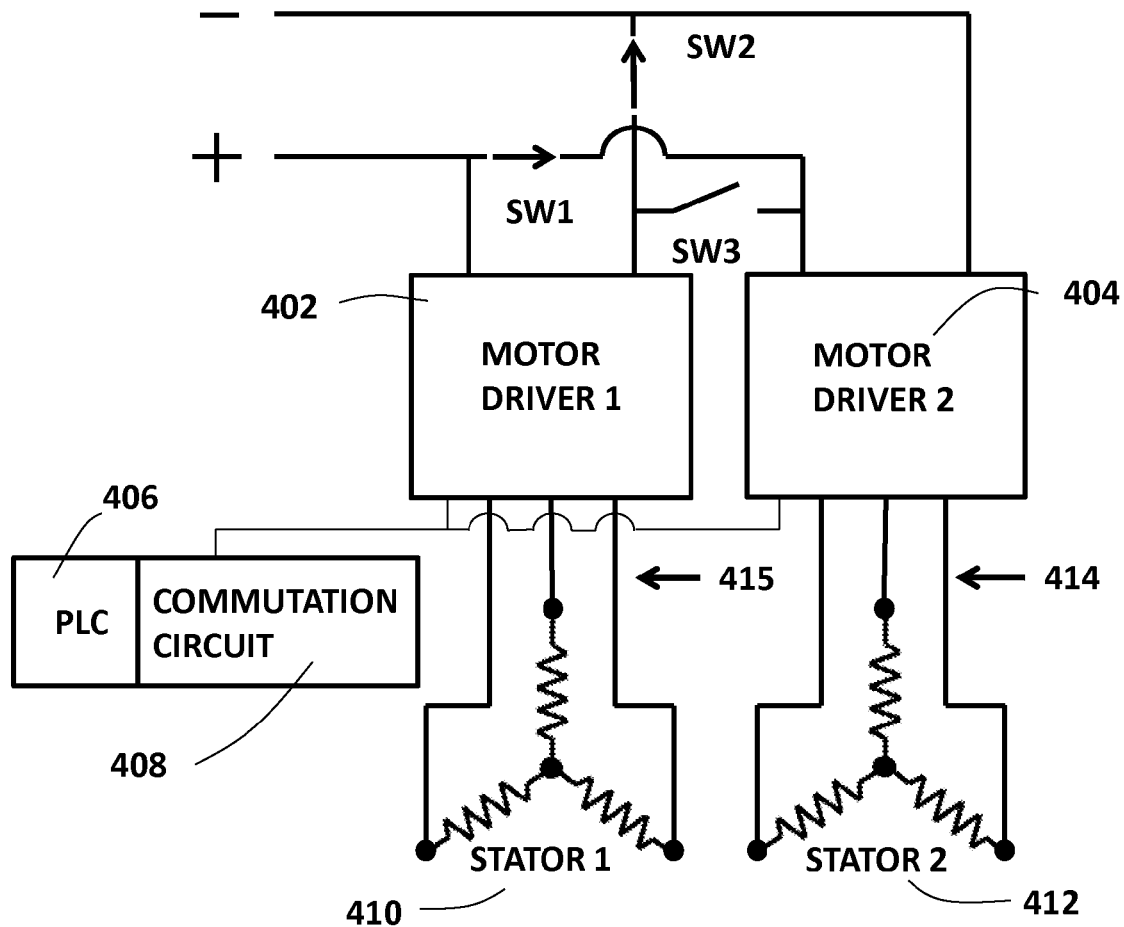
FIG. 5B is a schematic representation of a DC motor employing independently driven and switchable stators, in which the motor drivers are connected in parallel, in accordance with an embodiment of the present invention.

An electronic schematic representation of an embodiment of the invention is illustrated in FIG. 5A and FIG. 5B. The DC motor employs independently driven and switchable stators (stators 410, 412) that adjust DC motor torque and speed while remaining within the voltage limit of a power supply. Separate power electronics direct energy to separate stator elements, as in the uniaxial flux, biaxial flux or dual stator radial flux design embodiments. Alternatively, separate power electronics direct energy to contiguous stator elements, as in the single stator radial flux embodiment. Stators 410 and 412 may alternatively be considered as a set of stator multiphase windings, as in the uniaxial and radial flux topology with a single stator. As shown, power electronics 402 directs energy to stator 410, and power electronics 404 directs energy to stator 412. The power electronics are switched between series (FIG. 6A) and parallel connection (FIG. 6B) for either high torque or high speed operation of the motor. The series connection and high torque, or a parallel connection and high speed are described further below.

The controller 406 sets the first power electronics in series or in parallel with the second power electronics by way of switches SW1, SW2, and SW3. In an embodiment, the motor firmware sets the timing of the switches. A single commutation electronics can be used with both power electronics. The commutation electronics 408 determines electrical position of a rotor relative to stator 410 and stator 412, and synchronizes current pulses directed to a sequentially selected phase of stator 410 and stator 412, to generate a rotating magnetic field that communicates with the rotor. Synchronizing the current pulses keeps motor torque production uniform. In an embodiment, the invention utilizes a single PLC controller with commutation since either a single rotor or synchronized multiple rotors and synchronized stators are employed. The commutation electronics include Hall effect switches or optical switches to determine the first stator position relative to the rotor, and the second stator position relative to the rotor. Alternatively, the commutation electronics include a device to detect back EMF waveforms from the first stator and the second stator to determine the first stator position relative to the rotor, and the second stator position relative to the rotor.

It is to be appreciated that the rotor(s) and either stator 410 or stator 412 make up an independent DC motor. That is, the DC motor can function with stator 410 and without stator 412, without stator 410 and with stator 412, or with both stators 410 and 412. For example, the DC motor can function with stator 410 when stator 412 is disconnected. These separate stators and one or more rotors may be used to alter motor speed and torque characteristics.

In an embodiment, the present invention may be used with a conventional phase winding scheme in which the phases are connected together in either a WYE or a DELTA configuration. As an example, in a three phase motor (phases A, B and C), the three phases of the first stator and the three phases of the second stator are connected together in either a WYE or a DELTA configuration. In an embodiment, the present invention may be used with a conventional motor having series or parallel windings within each coil, and series or parallel connections of coils within a phase winding. The stator connections can be switched between series and parallel using mechanically reconfigurable stators that can be switched by changing interface connectors.

The current pulses to the phases are synchronized by way of driver switches of the first power electronics and of the second power electronics. Driver switches that are a unidirectional type can be used, such as a metal oxide semiconductor field-effect transistor (MOSFET) or an insulated-gate bipolar transistor (IGBT).

In an embodiment, the present invention employs six power carrying conductors that are connected to the motor. Three power carrying conductors are illustrated as 414 connecting power electronics 402 to stator 410, and three power carrying conductors are illustrated as 415 connecting power electronics 404 to stator 412.

For a series connection of the motor drivers, the output of one motor driving H-bridge feed the input of the second motor driving H-bridge. For a parallel connection, the two H-bridges are powered in parallel.

When the motor is operating in parallel mode, the parallel loads should be as closely matched as possible. The parallel stators, as in an embodiment of the present invention, closely matches the parallel loads more precisely than parallel teeth on a conventional stator.

Turning now to a representative example in which an embodiment of the present invention is employed, experimental data is provided for sizing a multiple stator motor for an example vehicle. Features of the discussion and claims are not limited to this particular design, which is shown only for purposes of the example.

The motor design parameters are first determined. The vehicle is a motorcycle with design requirements of: 1.) a top speed of 80 mph; 2.) continuous output power: 20 kW at maximum motor speed; 3.) available voltage from electronic speed control, ESC: 80 volts; and 4.) available start or short-term current from electronic speed control (ESC): 400 amps. Mechanical constraints are specified as: 1.) diameter of drive tire: 24 inches; and 2.) maximum drive sprocket reduction ratio: 4 to 1.

The torque constant (Kt) is determined. At 80 miles per hour (mph), the example motorcycle rear wheel rotates at 1125 rpm. At 80 mph, using a reduction ratio of 4:1, the motor rotates at 4500 rpm. 4500 rpm is equal to 471 radians/sec. The peak motor speed and the maximum ESC output voltage determine the voltage constant (Ke). In SI units, the voltage constant (V/rad/s) equals the torque constant, Kt (Nm/A). In the example, Ke=80V/471 rad/s, which is equal to 0.17V/rad/s. Kt=0.17 Newton-meters/amp (Nm/A).

The required Torque (T) is determined. The torque required at 20 kW and 4500 rpm is calculated using the equation: Power=Torque×Speed, or alternatively, Power (kW)=Torque (Nm)×Speed (rad/s). Solving for Torque, T=20 kW/471 rad/s=42.5 Nm.

The steady state current ($I_{ss}$) is determined. The current (I) needed to produce 42.5 Nm is determined from the equation: I=T/Kt. I=42.5 Nm/0.17 Nm/A=250 A. In the current example design $I_{ss}$ (I steady state, or continuous)=250 A, which applies to a motor designed to operate at 4500 rpm and 80V. When the configuration is switched to a series configuration at half speed (i.e., 2250 rpm), the torque output and power dissipation (heat loss) of 800 W remain constant. The current is $I_{parallel}/2$, so $I_{ss}=125$ A, but the resistance=4 times the parallel resistance (2R vs. R/2). Therefore, the heat loss ($I^2R$) is equal to the parallel motor configuration. The torque output is also constant and equal for both cases. The results of this example are illustrated in FIGS. 6-9.

Figure 6:
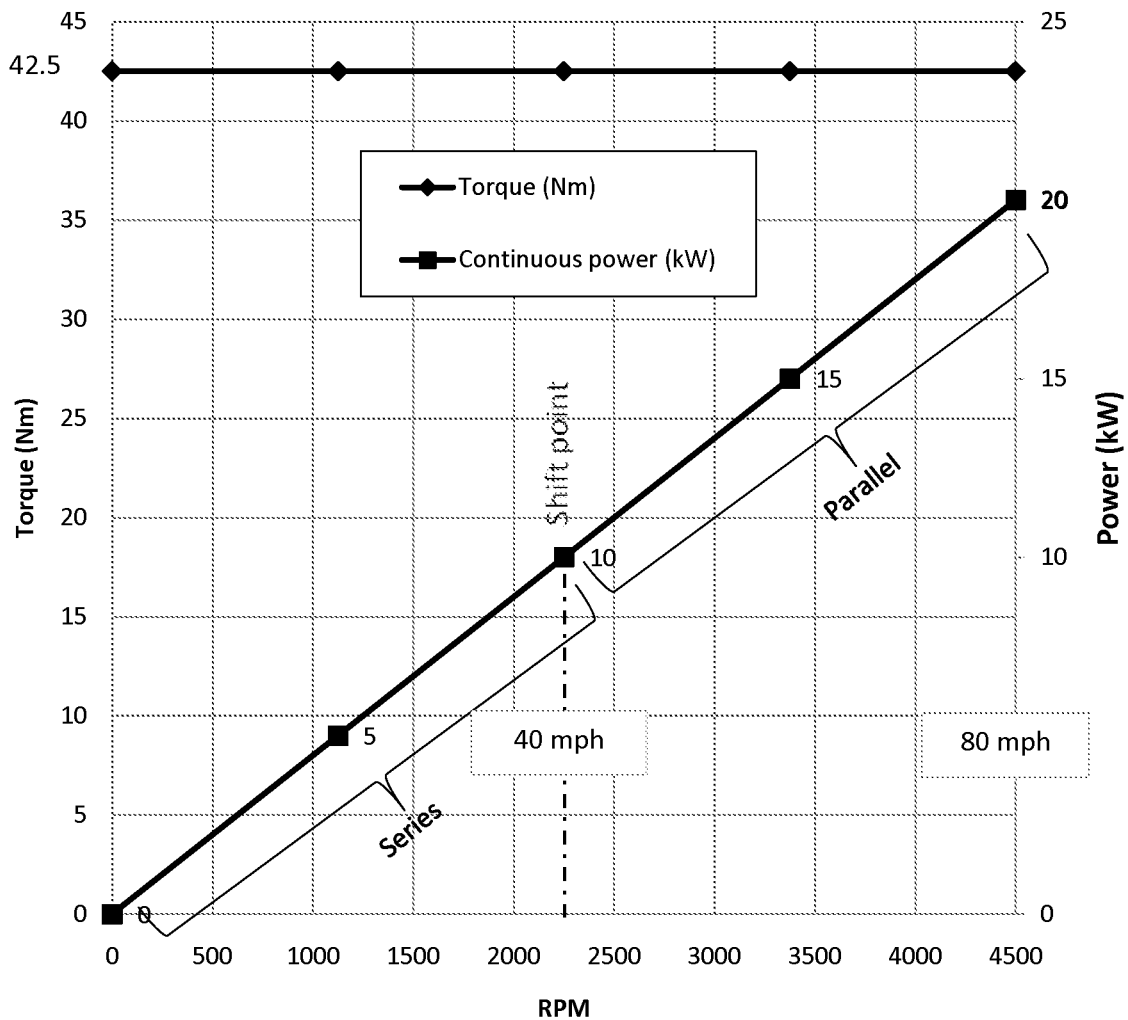
FIG. 6 is a representative graph illustrating experimental data of operational torque and power responses versus RPM at 800 watts steady state power dissipation, as observed from an embodiment of the present invention.

FIG. 6 is a representative graph illustrating experimental data of operational torque and power responses versus RPM at 800 watts steady state power dissipation, as observed from an embodiment of the present invention. The motor constant ($K_m$) is defined as: $K_m=K_t/2235.21$ sqrt(R). $K_m$ is also referred to as a measure of torque efficiency. As shown, the example motor generates a maximum continuous power of 20 kW at 4500 rpm (80 mph), 15 kW at 3375 rpm (60 mph), 10 kW at 2250 rpm (40 mph) and 5 kW at 1125 rpm. The motor winding configurations can be varied, but the maximum continuous power remains consistent, assuming a constant $K_m$.

Figure 7:
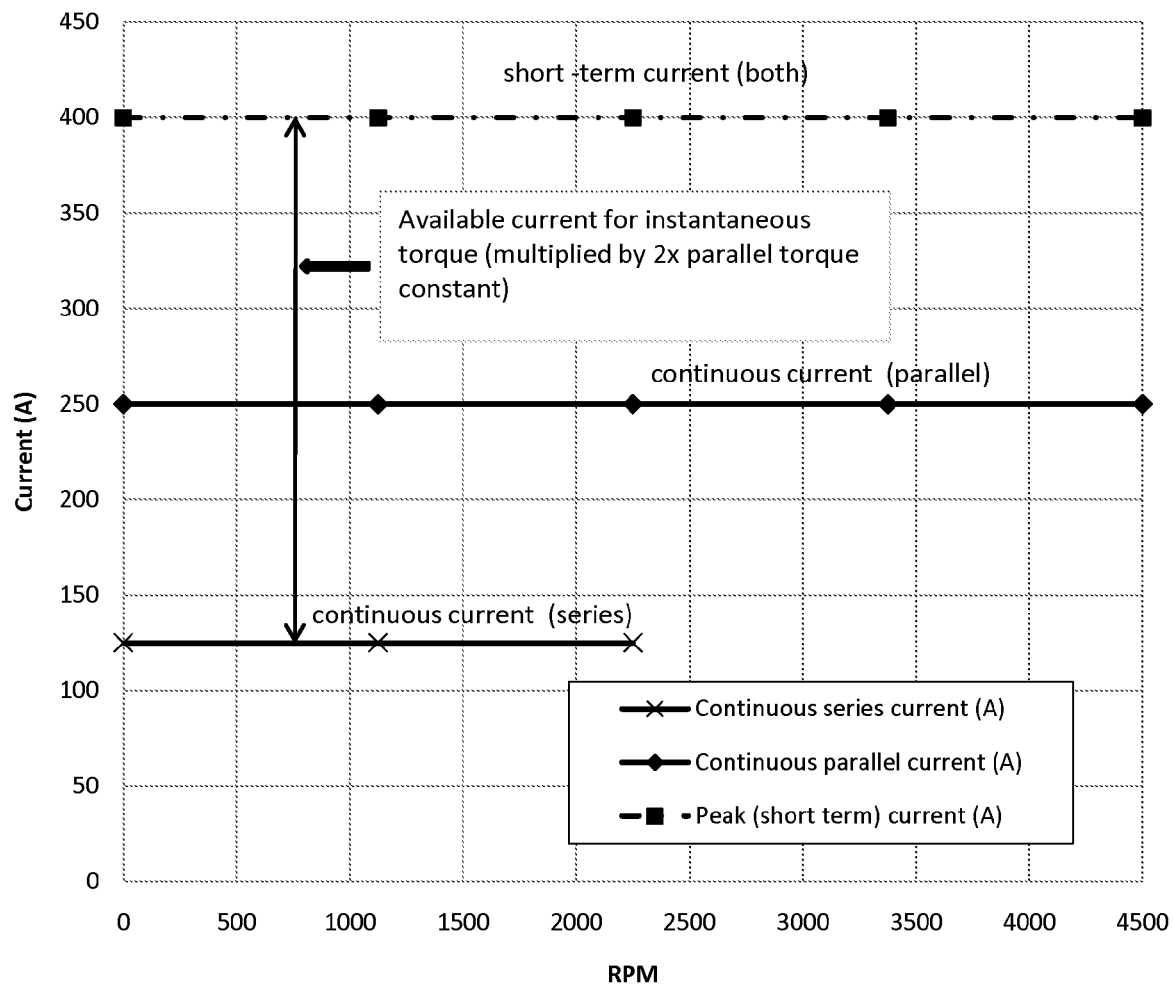
FIG. 7 is a representative graph illustrating experimental data of continuous current (series and parallel) and peak short-term current versus RPM, as observed from an embodiment of the present invention.

The ESC can deliver a greater current than the current required for steady state (SS) operation. The results of switching between serial and parallel stator connections is illustrated in FIG. 6 and FIG. 7. The torque values shown are those of the motor, not those produced by the drive wheel. The torque values produced by the drive wheel are equal to the motor torque multiplied by drive sprocket ratio.

When $K_m$ is held constant between multiple winding configurations, the motor efficiency is constant. This is illustrated in FIG. 6 by the constant steady state torque output of 42.5 Nm, for both series and parallel configurations. $K_m$ can be held constant between multiple winding configurations by keeping the winding fill factors the same. In an embodiment of the invention, $K_m$ is held constant since the windings do not change, and hence the fill factors do not change. The stators are reconnected in either a series or parallel connection.

Figure 8:
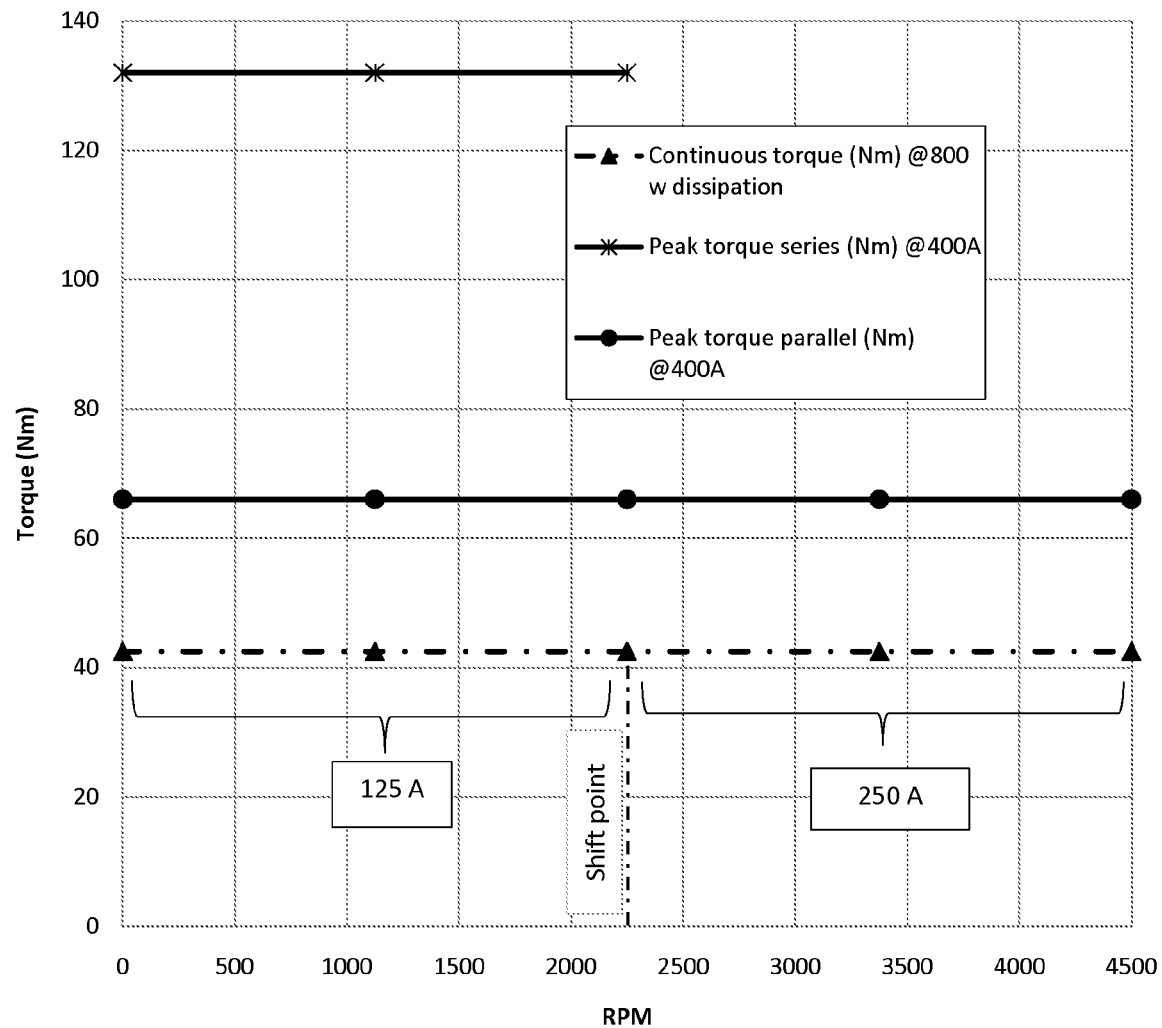
FIG. 8 is a representative graph illustrating experimental data of available short-term torque versus RPM, as observed from an embodiment of the present invention.

The magnetic circuit is sized for the maximum short-term current. Short term current is applied for vehicle acceleration. The motor is designed to accommodate the maximum short-term current without magnetic saturation of the stator. When connected in series, each phase receives twice the maximum current as compared to when it is connected in parallel. In this example, 400A is received by each of the phases in series, and 200A is received by each of the phases in parallel. The resulting torque is shown in FIG. 8. The series connected stators have twice the torque output of the parallel connected stators. This torque output is short-term. During continuous operation, the series and parallel connected stators are limited to the same torque output. During short-term applications of current, the current duty cycle is limited by the ESC to ensure the motor does not sustain thermal damage. The current duty cycle is calculated by the ESC as a function of serial or parallel connection, and the amplitude of the short-term current.

Figure 9:
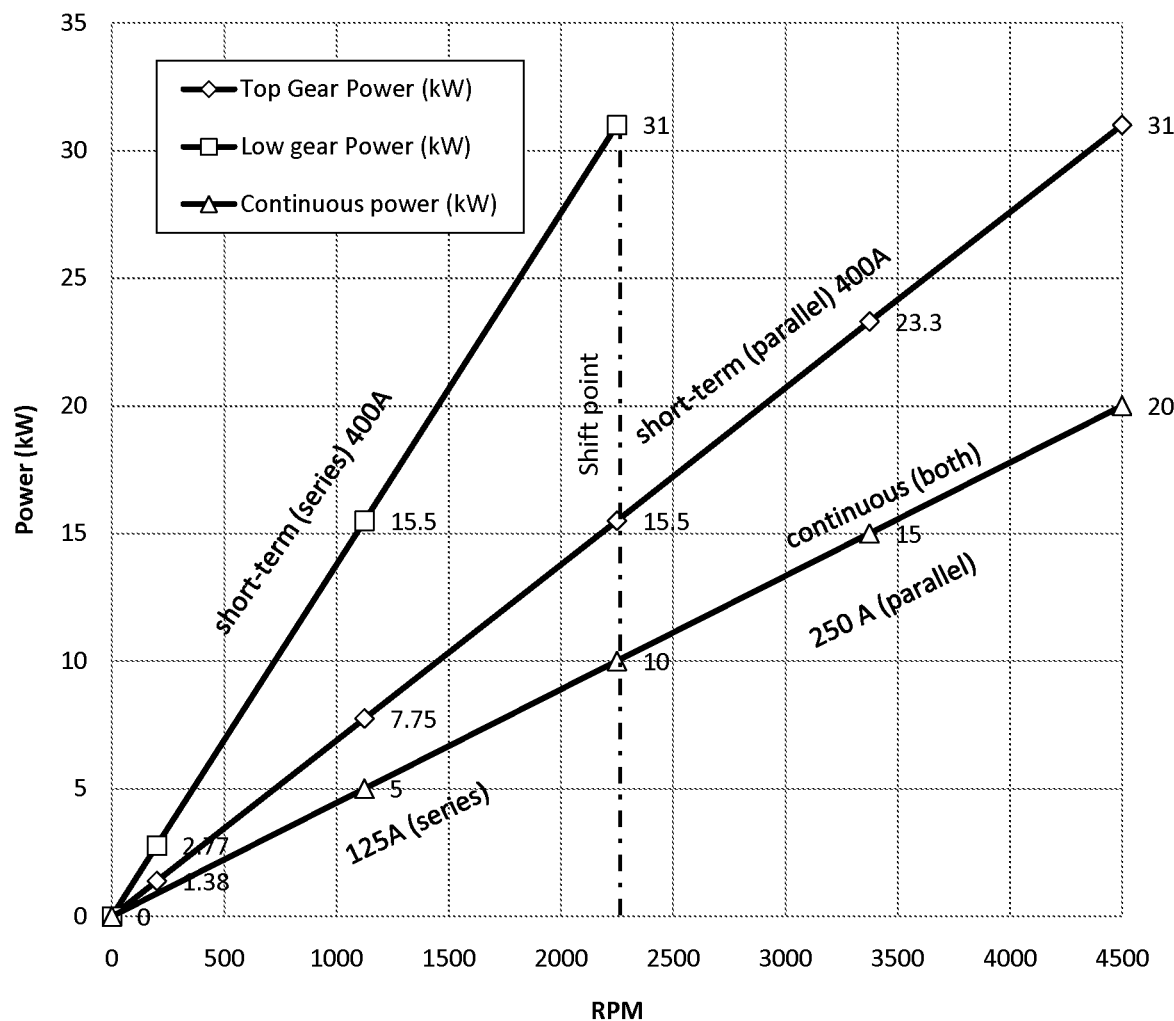
FIG. 9 is a representative graph illustrating experimental data of available short-term power versus RPM, as observed from an embodiment of the present invention.

FIG. 9 illustrates the available short term power versus RPM. The stator pair is designed to operate with short-term current and without magnetic saturation in both a parallel and series windings configuration. Consideration is given to the design of the series connection since each phase receives twice the current as compared to the parallel connection. In an embodiment, the stator is designed for a series winding connection, so that the full benefit of series/parallel switching is realized. In some motor designs, limited magnetic saturation of the stator may be acceptable in the series configuration, as long as it does not significantly reduce the torque output capability of the motor.

Figure 10:
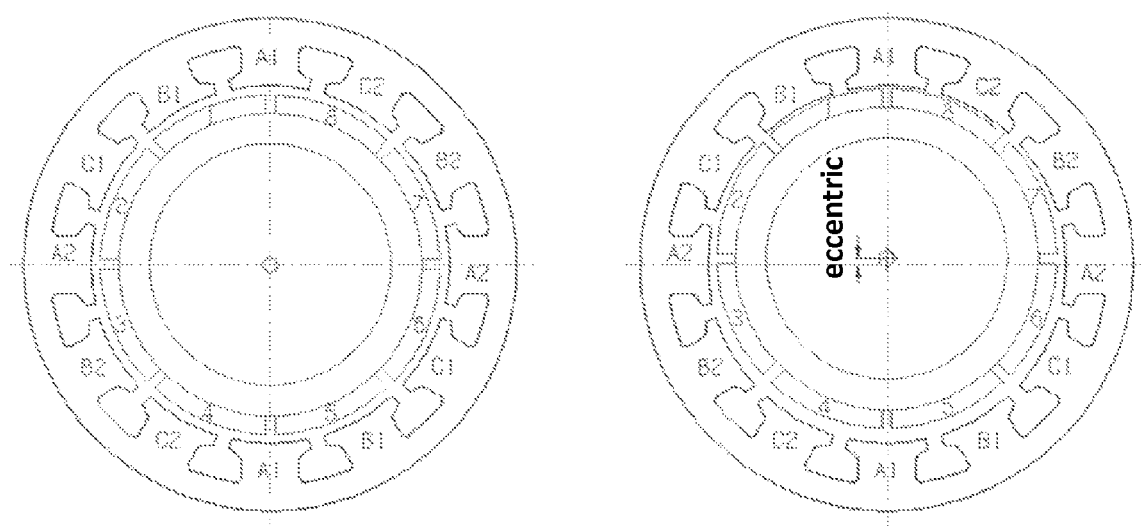
FIG. 10 is a sectional side view of stator teeth configuration for a radial flux motor employing a stator that includes two multiphase windings, in accordance with an embodiment of the present invention.

As previously described in an example embodiment, the stator of the uniaxial flux and radial flux single stator motor includes two multiphase windings. The first multiphase windings have at least 3 phases including phase A1, phase B1 and phase C1. The second multiphase windings have at least 3 phases including phase A2, phase B2 and phase C2. Phases A1 and A2, B1 and B2, C1 and C2 are like phases that do not share the same magnetic flux. FIG. 10 illustrates a stator tooth configuration example for a radial flux motor design employing a stator that includes two multiphase windings. In the example, teeth A1 and A1 (180 degrees apart) are wound in series, and teeth A2 and A2 (180 degrees apart) are wound in series. As illustrated, the tooth arrangement of teeth A1 and A2 cancels the effects of rotor to stator eccentricity, and ensures that phases A1 and A2 see the same temporal magnitude and direction of magnetic flux.

The uniaxial flux and radial flux single stator motors, having 3 phases and 2 multiphase windings, utilize a number of teeth that are divisible by 6. In an example, for radial flux motors, a minimum of 4 teeth in like phase pairs are utilized to cancel rotor eccentricity and therefore BEMF imbalance, making the number of stator teeth options 12, 18, 24, 30 . . . etc. In the biaxial flux motor design, the number of stator teeth utilized is divisible by 3, making the number of stator teeth options 3, 6, 9, 12 . . . etc.

The uniaxial flux motor with 1 stator and two rotors is designed such that a first air gap is situated between a first face of a first tooth and a first rotor, and a second air gap is situated between a second face of the first tooth and a second rotor. The first air gap can maintain a different average distance than the second air gap, since each tooth shares the magnetic flux from both rotors. Rotor tilting and non-perpendicularity of the rotors to the shaft are not canceled, unless the number and arrangement of teeth as in the radial flux motor design is followed. Also, the uniaxial flux motor is less susceptible to variations in magnetic strength, due to an averaging effect since the magnet number is doubled compared to a radial flux motor with the same number of magnetic poles.

Further, unlike the radial flux motor design, each tooth of the uniaxial flux motor undergoes the same variation in magnetic flux during one complete revolution. The variations in BEMF, caused by these cyclical flux variations, cause variations in current heating ($I^2 \times R$), which are the same for all coils. The uniaxial motor design is not restricted to a minimum of 4 teeth per phase, due to an averaging effect of tooth heating.

The Biaxial flux motor and uniaxial flux motor designs have a greater number of available magnet/tooth combinations than the radial flux design. Within a phase, the radial flux motor, in an embodiment, situates all coils at either 0 or 180 electrical degrees in phase with each other. The coils that are situated 180 degrees apart are wound in opposite direction, and thus the BEMF of each coil is in-phase. Unlike the axial flux motor, the coils of the radial flux motor that are out-of-phase may cause a BEMF imbalance between the parallel stators.

In an example comparison, the available number of magnets is illustrated for a 12 tooth stator:

| Single stator (Radial flux) | Multi stator (Biaxial and Uniaxial) | Electrical angles (each having 4 coils/phase) | | | |
|---|---|---|---|---|---|
| 4 | 4 | 0, | 0, | 0, | 0 |
| 8 | 8 | 0, | 0, | 0, | 0 |
|   | 10 | 0, | −30, | 0, | −30 |
|   | 14 | 0, | 30, | 0, | 30 |

Figure 11A:
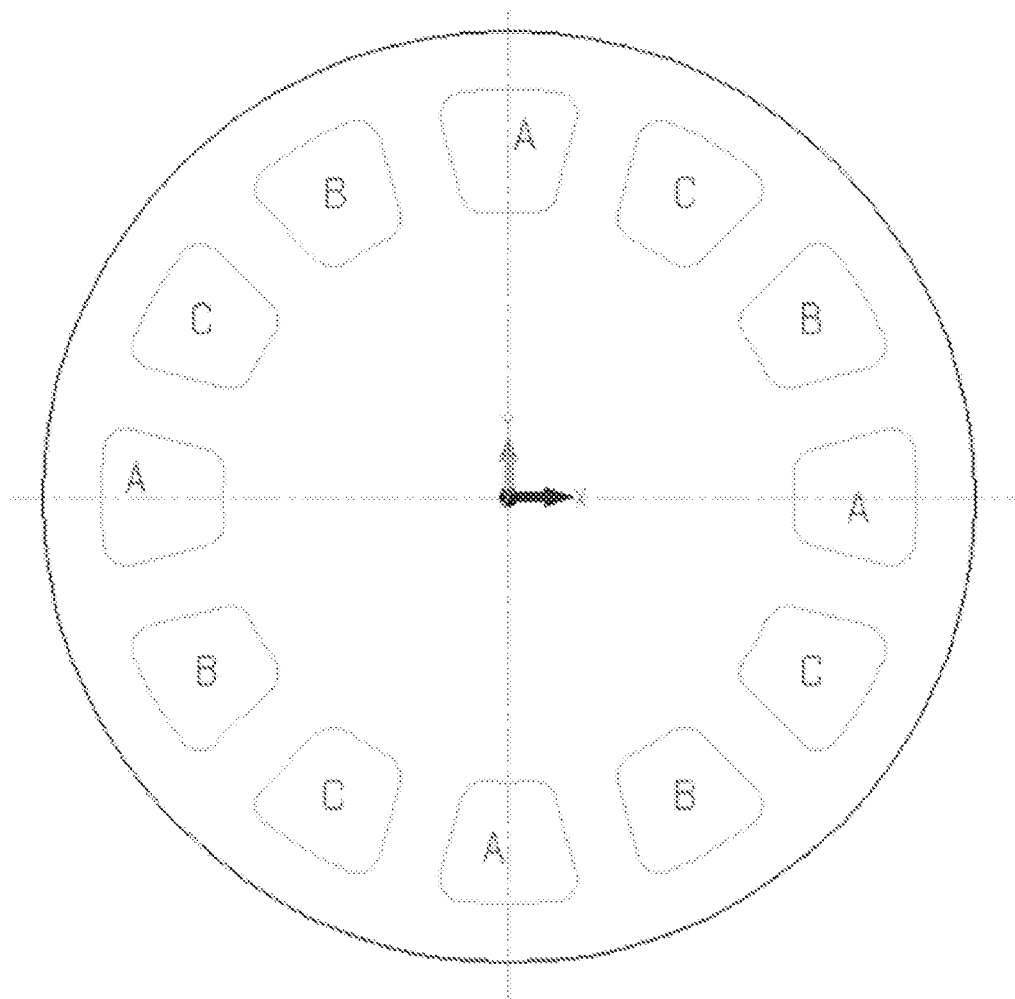
FIG. 11A is a sectional side view of a 12 tooth stator configuration that operates with a 4 or 8 pole rotor in which an embodiment of the present invention is useful.

FIG. 11A illustrates stator teeth configuration for a 12 tooth stator that operates with a 4 or 8 pole magnet/rotor. This configuration may be employed for the biaxial flux motor, uniaxial flux motor, and radial flux motor. As shown, stator teeth phases A and A are 180 degrees apart, teeth phases B and B are 180 degrees apart, and teeth phases C and C are 180 degrees apart.

Figure 11B:
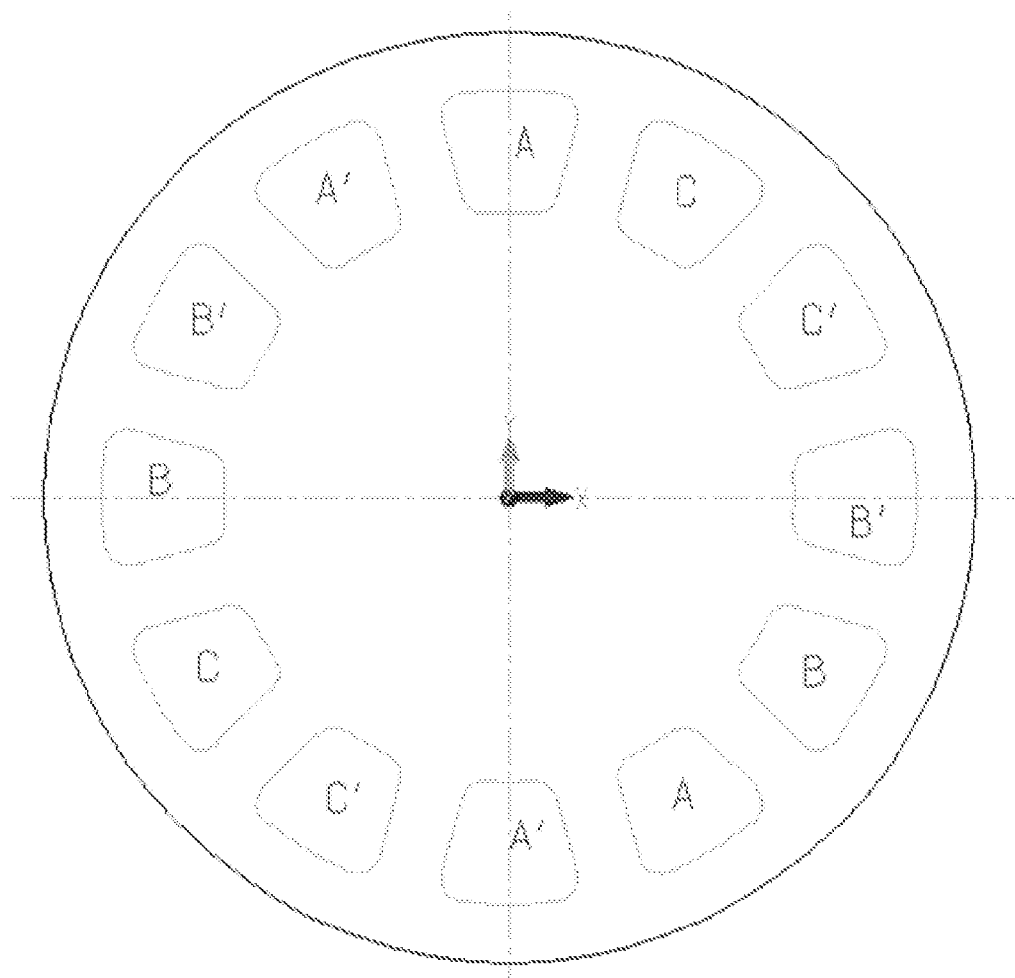
FIG. 11B is a sectional side view of a 12 tooth stator configuration that operates with a 10 or 14 pole rotor in which an embodiment of the present invention is useful.

FIG. 11B illustrates stator teeth configuration for a 12 tooth stator that operates with a 10 or 14 pole magnet/rotor. This configuration may be employed for a biaxial flux or uniaxial flux motor. However, the coils of a radial flux motor that are out-of-phase may cause a BEMF imbalance between the stators. As shown, stator teeth A and A are displaced 30 degrees, such that the teeth are situated 150 degrees apart. Similarly, stator teeth B and B are 150 degrees apart, teeth C and C are 150 degrees apart, teeth A-prime and A-prime are 150 degrees apart, teeth B-prime and B-prime are 150 degrees apart, and teeth C-prime and C-prime are 150 degrees apart.

Figure 12:
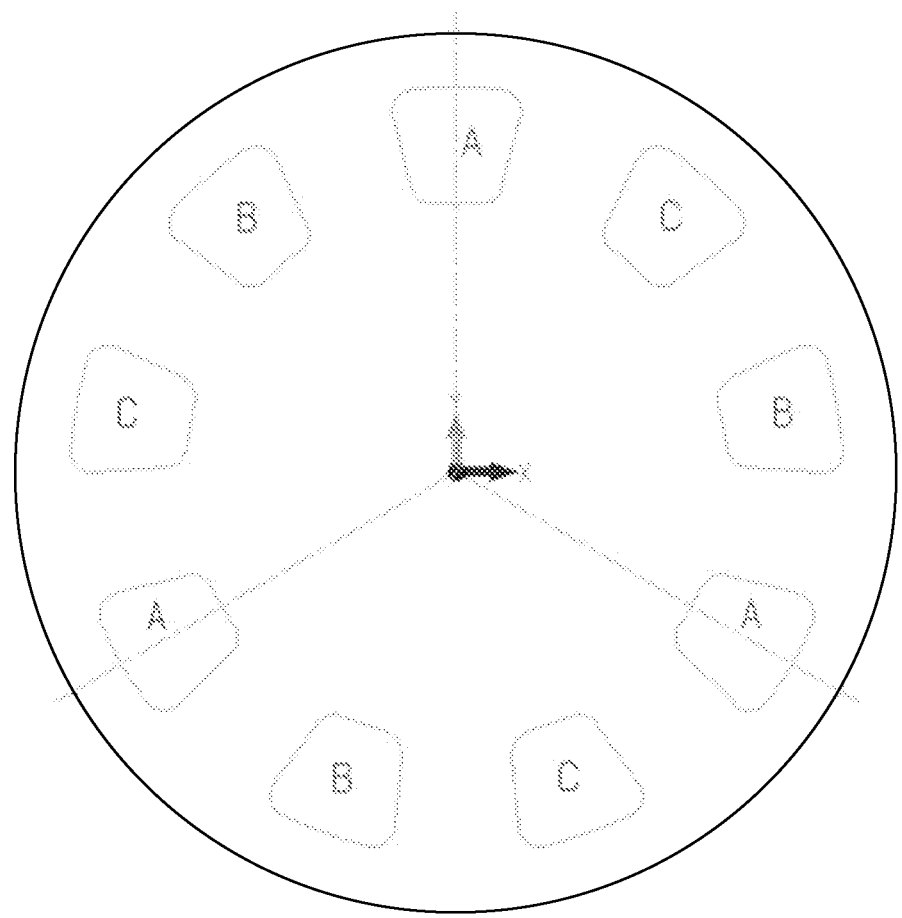
FIG. 12 is a sectional side view of a 9 tooth stator configuration that operates with a 6, 8 or 10 pole rotor in which an embodiment of the present invention is useful.

FIG. 12 illustrates stator teeth configuration for a 9 tooth stator that operates with a 6, 8 or 10 pole magnet. This configuration may be employed for a biaxial flux motor and a radial flux motor with two stators, but not with a uniaxial flux motor or a radial flux motor with a single stator. An even number of teeth per phase are utilized for a parallel connection of each phase pair. As shown, teeth A, A and A are 120 degrees apart from each other, teeth B, B and B are 120 degrees apart from each other, and teeth C, C and C are 120 degrees apart from each other.

Modifications and variations may be made to the disclosed embodiments while remaining within the spirit and scope of the invention. The implementations described above and other implementations are within the scope of the following claims.

What is claimed is:

1. A brushless direct current motor comprising:
at least a first stator and a second stator, positioned for relative rotation with a rotor;
a first power electronics for directing energy to the first stator, and a second power electronics for directing energy to the second stator;
a commutation electronics for determining electrical position of the rotor relative to the first stator and the second stator, and for synchronizing current pulses directed to a sequentially selected phase of the first stator and the second stator, to generate a rotating magnetic field that communicates with the rotor; and
a controller for setting the connection of the first power electronics in series or in parallel with the second power electronics.

2. The motor as in claim 1, wherein a magnetic flux passes from the first stator to the rotor and then to the second stator, and wherein the magnetic flux, which passes from the first stator, must pass through the rotor before reaching the second stator.

3. The motor as in claim 2, wherein
a.) the first stator comprises at least 3 phases including phase A1, phase B1 and phase C1; and
b.) the second stator comprises at least 3 phases including phase A2, phase B2 and phase C2;
wherein phases A1 and A2 are like phases that share the same magnetic flux, phases B1 and B2 are like phases that share the same magnetic flux, and phases C1 and C2 are like phases that share the same magnetic flux; and
wherein like phases undergo substantially same temporal magnitude and direction of magnetic flux.

4. The motor as in claim 1, wherein
a.) the first stator comprises at least 3 phases including phase A1 phase B1 and phase C1; and
b.) the second stator comprises at least 3 phases including phase A2, phase B2 and phase C2;
wherein phases A1 and A2 are like phases that do not share the same magnetic flux, phases B1 and B2 are like phases that do not share the same magnetic flux, and phases C1 and C2 are like phases that do not share the same magnetic flux; and
wherein like phases undergo substantially same temporal magnitude and direction of magnetic flux.

5. The motor as in claim 4, wherein the rotor comprises a first rotor and a second rotor; and wherein the first stator magnetically interacts with the first rotor, and the second stator magnetically interacts with the second rotor.

6. The motor as in claim 1, wherein the current pulses are synchronized via driver switches of the first power electronics and of the second power electronics, wherein the driver switches are a unidirectional type including a metal oxide semiconductor field-effect transistor (MOSFET) and an insulated-gate bipolar transistor (IGBT).

7. The motor as in claim 1, wherein the commutation electronics include one of: i.) Hall Effect switches, ii.) optical switches, and iii.) a device to detect back EMF waveforms from one of the first stator and the second stator, to determine the first stator position relative to the rotor, and the second stator position relative to the rotor.

8. The motor as in claim 1, wherein
a.) the first stator comprises at least 3 phases including phase A1 phase B1 and phase C1; and
b.) the second stator comprises at least 3 phases including phase A2, phase B2 and phase C2; and
wherein the three phases of the first stator and the three phases of the second stator are connected together in either a WYE or a DELTA configuration.

9. The motor as in claim 1, wherein the first stator and the rotor are structured to function as an independent motor separate from the second stator when the second stator is disconnected from energy, and wherein the second stator and the rotor are structured to function as an independent motor separate from the first stator when the first stator is disconnected from energy.

10. A brushless direct current motor comprising:
a stator positioned for relative rotation with a rotor, wherein the stator includes at least a first multiphase windings and a second multiphase windings; and
a first power electronics for directing energy to the first multiphase windings and a second power electronics for directing energy to the second multiphase windings;
a commutation electronics for determining electrical position of the rotor relative to the first multiphase windings and the second multiphase windings, and for synchronizing current pulses directed to a sequentially selected phase of the first multiphase windings and the second multiphase windings, to generate a rotating magnetic field that communicates with the rotor; and
a controller for setting the connection of the first power electronics in series or in parallel with the second power electronics.

11. The motor as in claim 10, wherein:
a.) the first multiphase windings includes at least a first, a second, and a third phase winding element;
b.) the second multiphase windings includes at least a fourth, a fifth, and a sixth phase winding element; and
c.) a magnetic flux passes from the first phase winding element to the rotor, and then to either the second phase winding element, the third phase winding element, the fourth phase winding element, the fifth phase winding element, or the sixth phase winding element.

12. The motor as in claim 10, wherein:
a.) the first multiphase windings includes at least a first, a second, and a third phase winding element;
b.) the second multiphase windings includes at least a fourth, a fifth, and a sixth phase winding element;
c.) the first phase winding element is adjacent to the second phase winding, element and to the fourth phase winding element; and
d.) a magnetic flux passes from the first phase winding element to the second phase winding element or to the fourth phase winding element, without having to pass through the rotor before passing to the second phase winding element or to the fourth phase winding element.

13. The motor as in claim 10, wherein
a.) the first multiphase windings comprises at least 3 phases including phase A1, phase B1 and phase C1; and
b.) the second multiphase windings comprises at least 3 phases including phase A2, phase B2 and phase C2;
wherein phases A1 and A2 are like phases that do not share the same magnetic flux, phases B1 and B2 are like phases that do not share the same magnetic flux, and phases C1 and C2 are like phases that do not share the same magnetic flux; and
wherein like phases undergo substantially same temporal magnitude and direction of magnetic flux.

14. The motor as in claim 13, wherein the rotor comprises a first rotor and a second rotor, and wherein the first multiphase windings magnetically interact with the first rotor and the second rotor, and the second multiphase windings magnetically interact with the first rotor and the second rotor.

15. The motor as in claim 10, wherein the current pulses are synchronized via driver switches of the first power electronics and of the second power electronics, wherein the driver switches are a unidirectional type including a metal oxide semiconductor field-effect transistor (MOSFET) and an insulated-gate bipolar transistor (IGBT).

16. The motor as in claim 10, wherein the first multiphase windings and the rotor are structured to function as an independent motor separate from the second multiphase windings when the second multiphase windings is disconnected from energy, and wherein the second multiphase windings and the rotor are structured to function as an independent motor separate from the first multiphase windings when the first multiphase windings is disconnected from energy.

17. A method for a direct current motor comprising:
directing energy to a first stator with a first power electronics, and directing energy to a second stator with a second power electronics, wherein the first stator and the second stator are positioned for relative rotation with a rotor;
employing a commutation electronics to determine electrical position of the rotor relative to the first stator and the second stator, and synchronize current pulses directed to a sequentially selected phase of the first stator and the second stator, to generate a rotating magnetic field that communicates with the rotor; and
connecting the first power electronics and the second power electronics in either series or in parallel to meet torque and speed requirements of the motor.

* * * * *